United States Patent [19]

Weigand et al.

[11] Patent Number: 5,294,256
[45] Date of Patent: Mar. 15, 1994

[54] ADDITIVES FOR HYDRAULIC CEMENT COMPOSITIONS

[75] Inventors: Willis A. Weigand, Chelmsford, Mass.; Chiara F. Ferraris, Columbia, Md.; James M. Gaidis, Ellicott City, Md.; Ellis M. Gartner, Silver Spring, Md.

[73] Assignee: W. R. Grace & Co.-Conn., New York, N.Y.

[21] Appl. No.: 922,114

[22] Filed: Jul. 28, 1992

Related U.S. Application Data

[63] Continuation of Ser. No. 371,950, Jun. 27, 1989, abandoned.

[51] Int. Cl.$^5$ .............................................. C04B 24/08
[52] U.S. Cl. .................................. 106/819; 106/822; 106/823; 524/650
[58] Field of Search ............... 106/314, 819, 822, 823, 106/504; 524/650

[56] References Cited

U.S. PATENT DOCUMENTS

| | | | |
|---|---|---|---|
| 2,243,501 | 5/1941 | Daimler et al. | 106/24 |
| 2,434,695 | 1/1948 | Helms | 106/92 |
| 2,491,487 | 12/1948 | Faulwetter | 117/63 |
| 2,576,955 | 12/1951 | Ludwig | 260/29.6 |
| 2,990,382 | 6/1961 | Wagner et al. | 260/17 |
| 3,486,916 | 12/1969 | Cordon | 106/314 |
| 3,486,960 | 12/1969 | Fitzgerald et al. | 156/297 |
| 3,645,763 | 2/1972 | Ronzio et al. | 106/90 |
| 3,826,663 | 7/1974 | Minicozzi | 106/314 |
| 3,850,651 | 11/1974 | Duncan et al. | 106/90 |
| 3,865,601 | 2/1975 | Serafin et al. | 106/95 |
| 3,885,985 | 5/1975 | Serafin et al. | 106/315 |
| 3,936,811 | 2/1976 | Kirst et al. | 106/90 |
| 4,021,257 | 3/1977 | Bernett | 106/90 |
| 4,021,259 | 5/1977 | Komatsu et al. | 106/111 |
| 4,064,062 | 1/1978 | Burge | 106/314 |
| 4,375,987 | 3/1983 | Lange et al. | 106/95 |
| 4,410,366 | 10/1983 | Berchall et al. | 106/90 |
| 4,434,257 | 2/1984 | Narisawa et al. | 106/90 |

FOREIGN PATENT DOCUMENTS

| | | |
|---|---|---|
| 65339 | 8/1932 | Luxembourg . |
| 8501500 | 4/1985 | PCT Int'l Appl. . |
| 385658 | 1/1933 | United Kingdom . |

OTHER PUBLICATIONS

"Methocel Cellulose Ethers in Masonry Cements and Mortars", Dow Chemical, Date Unknown.
"Staley ® Developmental Product C3-440 Water Soluble Polymer", A. E. Staley Mfg. Co., Date Unknown.

Primary Examiner—Mark L. Bell
Assistant Examiner—Paul Marcantoni
Attorney, Agent, or Firm—Nicholas P. Triano, III; William L. Baker

[57] ABSTRACT

The present invention provides additives for hydraulic cement compositions, particularly masonry cements, which improve the water-repellancy, workability, and board life of said compositions. The additives of the invention comprise a water-insoluble, water-repelling acid, a set retarding composition, an emulsifier, and a polymer selected from the group consisting of polyvinyl alcohol, polyvinyl acetate, hydroxypropyl substituted polysaccharides, and mixtures thereof.

18 Claims, No Drawings and # ADDITIVES FOR HYDRAULIC CEMENT COMPOSITIONS

This is a continuation of co-pending application Ser. No. 07/371,950, filed Jun. 27, 1989, now abandoned.

BACKGROUND OF THE INVENTION

This invention relates to additives for hydraulic cement compositions. More particularly, this invention concerns additives for hydraulic cement which are particularly useful in Portland cement compositions such as masonry cements used to bond brick, block, etc.

Portland masonry cements are compositions produced particularly for use by masons in the bonding of bricks, blocks and the like. Such cements are typically mixed prior to use with a fine aggregate, usually sand, and water. It is desirable that the wet mortar have a high degree of plasticity for working (e.g. troweling) by the mason, as well as other desirable properties such as good "board life" (i.e. a long working time), water-repellancy, etc.

Masonry cements are produced by intergrinding Portland cement (containing gypsum for proper setting time regulation), with, generally, from about 35 to 65%, based on the total weight, of a solid material such as limestone, chalk, talc, pozzolans, clay, gypsum, or combinations of such. Limestone is most often the ingredient interground with the Portland cement because of its good plasticity enhancing properties. Such masonry cements are ground to a greater degree of fineness than most Portland cements intended for use in structural concretes. The finer grind of masonry cements improves the plasticity of the finished mortar products.

Additive products are sold for mixture with the masonry cement, such additive products being designed to impart certain desirable properties to the masonry cement composition. It is common practice to mix such additive products with the cement during the intergrinding of the cement with the gypsum, limestone, etc.

In U.S. Pat. Nos. 3,865,601 and 3,885,985 additive products of the above type are described. The additives described therein comprise an aqueous oil-in-water emulsion containing water, a water insoluble, water-repelling acid component (e.g. tall oil), an emulsifier (e.g. a salt of such acid), and a setting time-retarding agent (e.g. sucrose). This additive product is advantageously dispersible in water which reduces the risk of it being overdosed. The additive may also contain an air-entraining agent as an additional optional component.

An improved emulsion additive product is described in U.S. Pat. No. 4,375,987. In addition to the above-described constituents, this additive further comprises an emulsion stabilizer, (e.g. a glycol), which prevents the oil-in-water emulsion from destabilizing when exposed to freezing temperatures during shipping or storage prior to use.

The emulsion additive products described in the aforementioned patents have been successfully used to improve the water-repellancy and plasticity of Portland masonry cements. However, in order to obtain optimal plasticity and workability and extended board life it is often necessary to further add a water retention agent, such as a cellulose ether, during the grinding process. Conventional water retention agents cause the emulsion additives described above to destabilize and hence must be added as a separate feed stream, often as a dry powder. This method of addition is inconvenient, may increase manufacturing costs, and increases the risk of overdosing the batch with the water retention agent. These conventional water retention agents also may entrain large quantities of air, which may be undesirable where high strength is required.

Thus, it is desired to provide an emulsion additive which would, without the addition of a separate water retention agent, provide excellent water-repellancy, workability, plasticity, and other properties desired of masonry cements.

SUMMARY OF THE INVENTION

The present invention provides improved emulsion additives which, when interground with Portland cement, produce a masonry cement having superior workability, plasticity and board life. The additives of the present invention can be conveniently added during the grinding process as a single, stable emulsion, thus reducing the risk of overdosing.

The improved additives of the present invention comprise an oil-in-water emulsion in which the solids portion is comprised of a major proportion of a water-insoluble, water-repelling acid component selected from the group consisting of fatty acids, rosin acids and mixtures thereof, a set retarding component for said hydraulic cement, and a polymer selected from the group consisting of polyvinyl acetate, polyvinyl alcohol, hydroxypropyl substituted polysaccharides, or mixtures thereof. In a preferred embodiment, the additives further comprise an emulsifier formed by reacting said acid component with a base capable of forming a salt thereof, which salt will form a stable emulsion.

In one embodiment, the emulsion additive comprises from about 60% to 95% of a water-insoluble, water-repelling acid selected from the group consisting of fatty acids, rosin acids and mixtures thereof; from about 10% to about 20% of a set retarding composition; from about 0.1% to about 0.3% of an emulsifier; and from about 8% to about 18% of a polymer selected from the group consisting of polyvinyl acetate, polyvinyl alcohol, hydroxypropyl substituted polysaccharides, and mixtures thereof.

The present invention also provides a method which comprises intergrinding a Portland cement with the additives of the invention, and a hydraulic cement composition comprising Portland cement and the additives of the invention.

DETAILED DESCRIPTION OF THE INVENTION

The emulsion additive products of the present invention comprise an aqueous oil-in-water emulsion containing water, a water-insoluble, water-repelling component, an emulsifier, a set-retarding agent, and a polymer selected from the group consisting of polyvinyl acetate, polyvinyl alcohol, hydroxypropyl substituted polysaccharides, and mixtures thereof. The water-repelling component, emulsifier, and set-retarding agent may be as described in the aforementioned U.S. Pat. Nos. 3,865,601 and 3,885,985. The additive composition may further comprise an emulsion stabilizer, as described in U.S. Pat. No. 4,375,987, and optionally an air entraining agent. The disclosures of these patents are incorporated herein by reference.

The water repelling component of the emulsion may comprise a water-insoluble fatty acid, rosin acid or mixture thereof, such as is found in tall oil. Generally, the level of rosin acid in the water repelling component does not exceed about 25% by weight of the component. Other water-insoluble, water-repelling components could be used in the additive of the invention, provided that they impart adequate water-repellancy to the masonry cement, and form a stable emulsion with the other components of the additive. The water-repelling component is present as a major proportion of the solids portion of the emulsion, that is, greater than 50%, preferably from about 60% to 95% by weight of the solids portion.

Any emulsifier which is capable of dispersing the water-repelling component in the aqueous phase of the emulsion and which does not have a deleterious effect on the finished cement composition can be used. A salt of a fatty or rosin acid, or mixture of such, particularly an alkali metal salt of such acid is preferred as the emulsifying agent. In a particularly preferred embodiment, the emulsifier is prepared in situ, by adding a base such as sodium hydroxide to the acid waterproofing component to produce the salt. In this embodiment enough of the base is added to produce sufficient emulsifier to give an emulsion, generally about 0.10% to 0.30%, and preferably about 0.25% based on the total solids. Other emulsifiers which may be employed include esters of fatty alcohols such as the sulfate, for example ammonium sulfate esters thereof; aromatic sulfonates such as ammonium, alkali and alkaline earth metal aromatic sulfonates; saponified phenols or naphthenic acids, etc. Emulsifiers of the anionic or nonionic type may be used such as for example, liquids or solids selected from the group of alkaryl polyoxalkylene alkanols and derivatives thereof such as esters thereof for example, ammonium sulfate esters; and polyoxyethylene derivatives of hexitol anhydride partial long chain fatty acid esters. Mixtures of any of the foregoing may be used. In general, the emulsifier is employed in the additive composition of the invention in an amount of at least about 0.5% by weight of the solids. In a preferred embodiment, the emulsifier is employed in an amount of from 0.1% to 0.3% by weight of the solids.

As the set-retarding component of the additive of the invention, any of the known retarders for hydraulic cements may be employed, provided that the retarder used does not destabilize the emulsion or cause the additive to be overly viscous. Water-soluble set-retarding agents for Portland cement are well known and are preferred for use in the present invention. Illustrative of such retarders are carbohydrates such as monosaccharides, for example glucose and fructose; disaccharides, for example raffinose; polyhydroxy polycarboxylic compounds, such as tartaric acid and mucic acid; lignosulfonic acid and salts thereof such as calcium, magnesium, ammonium and sodium lignosulfonate; water-soluble salts of boric acid, such as the alkali metal salts thereof; as well as mixtures thereof. The amount of the retarding agent employed in the additive of the invention generally ranges from about 3 to about 35, and preferably from about 10 to about 20 percent by weight of the solids.

The water-repelling acid component or the emulsifying component may entrain some air in the cement composition, but in some instances more entrained air may be desired. In such instances, the air entrainment may be increased by the addition of an air-entraining agent. Any conventional air-entraining agent, (e.g. alkali metal salts of tall oil acids), may be used in the invention, as long as it is compatible with the other components of the emulsion. Preferred air entraining agents are condensation products of ethylene oxide with e.g. an aromatic organic compound such as substituted or unsubstituted phenol or an aliphatic organic compound such as fatty acid, alcohol, ester, aldehyde, amine, etc. The amount of this optional air-entraining component is generally from about 1 to about 5 weight percent of solids.

The amount of water employed in the emulsion is preferably at least about 25 to 35 percent by weight of the total. A preservative may be used in the additive of the invention to prevent spoilage, and about 1 percent of the preservative is generally found to be effective.

The additive of the invention may further comprise an emulsion stabilizing additive. This emulsion stabilizing additive is a low molecular weight organic compound which prevents the emulsion from destabilizing when it is exposed to low temperatures during storage or shipment. The emulsion stabilizer is generally an alcohol, ketone, amide, or aldehyde. Preferred emulsion stabilizers are lower molecular weight polyhydric alcohols such as glycols; an especially preferred glycol is diethylene glycol. The amount of the emulsion stabilizing additive utilized in the additives of the invention generally ranges from about 3% to 25%, and preferably from about 6% to 15% by weight of the total emulsion product.

According to the invention, the additives of the invention further comprise a polymer selected from the group consisting of polyvinyl acetate, polyvinyl alcohol, hydroxypropyl substituted polysaccharides, and mixtures thereof. It has been found that polyvinyl acetate provides optimal emulsion stability and the polysaccharides provide superior workability of the masonry cement, and thus these polymers and mixtures thereof are preferred in the invention. Various grades of polyvinyl alcohol and polyvinyl acetate are available, which differ primarily in their molecular weight. Most grades have been found to perform well in the additives of the invention. Polyvinyl alcohols having low molecular weight, as indicated by a low viscosity in water, e.g. 10–15 centipoises in a 4% aqueous solution at 20 degrees C., are preferred. A preferred polyvinyl acetate is DARAWELD C®, available commercially from W.R. Grace & Co.-Conn.; preferred polyvinyl alcohols are DUPONT® ELVANOL® 90–50 or 75–15. When conventional starch is added to the waterproofing emulsions of the invention in amounts adequate to enhance workability, board life, etc., the emulsion "viscosifies" (becomes extremely viscous), and may even gel. However, the addition of the hydroxypropyl substituted polysaccharide provides a stable emulsion which may be stored for periods of up to several months, and can undergo the temperature changes which may be encountered when the additive is stored in drums without breaking of the emulsion or gelation. A preferred hydroxypropyl substituted polysaccharide is STALEY® C3-440, available from A.E. Staley Mfg. Co..

The level of addition of the polymer component to the additives of the invention is generally from 2% to 20% by weight of the solids. It has been found that the addition of more that 20% of polyvinyl acetate may actually decrease the workability of the cement; thus levels of less than 20% are preferred, preferably from 8% to 18%, and most preferably from 10% to 15% by weight of the solids. When polyvinyl acetate is the polymer used in the additive, levels of addition are similar to those when polyvinyl alcohol is used. When the polymer selected is a hydroxypropyl substituted polysaccharide, levels of less than 15% are generally preferred, as higher levels of addition may produce a high viscosity mixture. Depending upon the polysaccharide used, levels of as low as 2% may produce a significant improvement in the properties of the mortar. The preferred level of polysaccharide is from 2% to 10% by weight of the solids.

Additional conventional additives may be added to the additives of the invention, provided that they do not destabilize the emulsion or deleteriously affect the properties of the cement product.

In use as an additive to cement compositions, the improved emulsion additives of the invention are incorporated in an amount generally ranging from about 0.001 to about 0.3 percent by weight of additive solids based upon the weight of the cement. The preferred manner of addition is by intergrinding the emulsion with the cement or cement clinker. The additives of the invention can be ideally initially dispersed in a greater proportion of water, in which form it can be more accurately dispersed into the cement.

The following detailed examples are illustrative only, and are not to be considered as limiting.

EXAMPLE 1

A series of additive compositions of this invention was prepared utilizing the components and proportions shown in Table 1. Each of the formulations of Table 1 was prepared by mixing the water, sucrose, diethylene glycol, tall oil, ethanol, and formaldehyde until dissolved, then adding the triethanolamine and mixing. This mixture was passed through a two-stage Gaulin laboratory homogenizer set at 2000 psi and 1000 psi to form a stable suspension. To this suspension was added the polymer component while stirring slowly. The mixture was then stirred about 30 minutes in order to dissolve or disperse the polymer.

Each of the formulations of Table 1 were then interground with a Portland masonry cement comprising 1750 g of crushed clinker (20 mesh), 1645 g of crushed limestone (20 mesh), and 105 g of crushed gypsum, at a level of 0.1% solids of the additive based on total solids. The grinding mills were operated for 14,400 revolutions at 230 degrees F. 420 grams of each resulting ground cement product was then mixed with 720 g of graded sand, 720 g of 20/30 sand, and sufficient water to produce a flow of 110±5 according to ASTM C-91 tests for masonry cements (mortars).

The resulting masonry cements, numbered corresponding to the sample numbers of Table 1, and a blank masonry cement prepared as above but containing no additives (sample number 0), were then tested for water retention and board life, with results as shown in Table 2. Water retention was tested using ASTM C-91; board life was tested by measuring flow per ASTM C-91 at 20 minute intervals for one hour, and then dividing the flow at 60 minutes by the initial flow and multiplying by 100 to obtain a percentage value.

The results of Table 2 show that there is a significant increase in board life in the samples which contain both the additives of the invention and the conventional additive as compared to sample 0, which contains no additive. A qualitative increase in the workability of samples 2 and 3 containing the additives of the present invention was observed, as compared to the workability of sample 1 containing a conventional additive. As shown by Table 2, this improved workability was realized without a statistically significant loss in water retention or board life.

EXAMPLE 2

An improved product according to the invention as prepared in Example 1, sample 2, was field tested by a commercial producer of Portland masonry cement, for use as an additive during the production of the masonry cement product. The inventive product was added during the customary intergrinding of the typical masonry cement components, Portland cement clinker and limestone. The additive product remained stable up to the point of use, and was added for the purpose of imparting water repellancy, set-retardation and improved workability and board life to the masonry cement product. The resulting masonry cement had superior workability and board life, and a favorable air content of 13-14%.

EXAMPLE 3

The additives of Table 1 were further tested for emulsion stability. The additives were tested by initially freezing the emulsions for 20 hours at 0 degrees C., then temperature cycling from 60 degrees C. to 0 degrees C., holding for 2 hours at each temperature. This temperature cycle was repeated for three complete cycles without breaking of the emulsion. These results indicate that the additives of the invention could be stored for a period of several months prior to use, and could undergo the temperature changes associated with the storage of these additives in drums.

TABLE 1

| Composition | Sample | | |
|---|---|---|---|
| | 1 | 2 | 3 |
| water | 395 | 395 | 395 |
| sucrose | 118 | 118 | 118 |
| diethylene glycol | 60 | 60 | 60 |
| tall oil | 394 | 394 | 394 |
| air entraining agent | 12.3 | 12.3 | 12.3 |
| formaldehyde* | 7.6 | 7.6 | 7.6 |
| triethanolamine | 12.3 | 12.3 | 12.3 |
| STALEY ® C3-440 | — | 33 | — |
| polyvinyl acetate** | — | — | 200 |

*37% solution of formaldehyde
**50% solution of polyvinyl acetate

TABLE 2

| Sample | Water Retention | Board Life |
|---|---|---|
| 0 | 60% | 61% |
| 1 | 77% | 76% |
| 2 | 74% | 73% |
| 3 | 74% | 77% |

What is claimed is:
1. A stable oil-in-water emulsion cement additive comprising:
a) from about 50 to 95% by weight, based on the total solids, of a water-insoluble, water-repelling acid component selected from the group consisting of fatty acids, rosin acids, and mixtures thereof;
b) from about 3 to 35% by weight, based on the total solids, of a set retarding component;
c) from about 2 to 20% by weight, based on the total solids, of a low molecular weight workability-enhancing polymer component selected from the group consisting of polyvinyl alcohol; hydroxypropyl substituted polysaccharides; polyvinyl acetate; and mixtures thereof; wherein said workabili- ty-enhancing polymer is dissolved in said cement additive;
d) an amount of an emulsifier component effective to provide an emulsion; and
e) water.

2. The additive of claim 1 wherein said workability-enhancing polymer is present in an amount of from 2% to 20% by weight of the solids.

3. The additive of claim 1 wherein said workability-enhancing polymer is polyvinyl alcohol or polyvinyl acetate, and is present in an amount of from 8% to 18% by weight of the solids.

4. The additive of claim 3 wherein said workability-enhancing polymer is present in an amount of from 10% to 15% by weight of the solids.

5. The additive of claim 1 further comprising an emulsion stabilizing additive component.

6. The additive of claim 5 wherein said emulsion stabilizing additive component is present in an amount of from about 3% to 25% by weight of said additive.

7. The additive of claim 5 wherein said emulsion stabilizing additive component is present in an amount of from about 5% to 15% by weight of said additive.

8. The additive of claim 1 wherein said set retarding component is selected from the group consisting of monosaccharides; disaccharides; polyhydroxypolycarboxylic acids; lignosulfonic acid and salts thereof; water-soluble salts of boric acid; and mixtures thereof.

9. The additive of claim 8 wherein said set retarding component is present in an amount of from about 3% to about 35% by weight of the solids.

10. The additive of claim 8 wherein said set retarding component is present in an amount of from about 10% to about 20% by weight of the solids.

11. The additive of claim 1 wherein said water-repelling acid component is present in an amount of from about 60% to 95% by weight of the solids.

12. The additive of claim 1 wherein said emulsifier component is formed by reacting said acid with a base capable of forming a salt thereof.

13. The additive of claim 1 wherein said emulsifier is present in an amount of from 0.1% to 0.3% by weight of the solids.

14. The additive of claim 1 wherein said emulsifier component is selected from the group consisting of aromatic sulfonates; saponified phenols; napthenic acids; esters of fatty alcohols; and mixtures thereof.

15. The additive of claim 1 further comprising an air-entraining agent.

16. The additive of claim 15 wherein said air-entraining agent is a condensation product of ethylene oxide.

17. A method of making cement comprising the step of intergrinding Portland cement clinker with a stable oil-in-water emulsion cement additive comprising: a) from about 50 to 95% by weight, based on the total solids, of a water-insoluble, water-repelling acid comopnent selected from the group consisting of fatty acids, rosin acids, and mixtures thereof; b) from about 3 to 35% by weight, based on the total solids, of a set retarding component; c) from about 2 to 20% by weight, based on the total solids, of a low molecular weight workability-enhancing polymer component selected from the group consisting of polyvinyl alcohol; hydroxypropyl substituted polysaccharides; polyvinyl acetate; and mixtures thereof; wherein said workability-enhancing polymer is dissolved in said cement additive; d) an amount of an emulsifier component effective to provide an emulsion; and e) water.

18. The method of claim 17 wherein the amount of said cement additive is in the range of from about 0.001% to 0.3% by weight of additive solids, based on the weight of said Portland cement.

* * * * *